US008335522B2

(12) United States Patent
Mate et al.

(10) Patent No.: US 8,335,522 B2
(45) Date of Patent: Dec. 18, 2012

(54) METHOD AND APPARATUS FOR MOBILE ASSISTED EVENT DETECTION AND AREA OF INTEREST DETERMINATION

(75) Inventors: Sujeet Shyamsundar Mate, Tampere (FI); Igor Danilo Diego Curcio, Tampere (FI)

(73) Assignee: Nokia Corporation, Espoo (FI)

( * ) Notice: Subject to any disclaimer, the term of this patent is extended or adjusted under 35 U.S.C. 154(b) by 432 days.

(21) Appl. No.: 12/618,752

(22) Filed: Nov. 15, 2009

(65) Prior Publication Data

US 2011/0117934 A1 May 19, 2011

(51) Int. Cl.
*H04W 24/00* (2009.01)
(52) U.S. Cl. .................. 455/456.3; 455/414.3; 455/466; 705/14.58
(58) Field of Classification Search ....... 455/456.1–457, 455/414.1–414.3, 466; 705/14.4, 14.58, 705/14.64
See application file for complete search history.

(56) References Cited

U.S. PATENT DOCUMENTS

| 5,912,862 | A | 6/1999 | Gustavsen et al. | |
|---|---|---|---|---|
| 6,505,046 | B1 * | 1/2003 | Baker | 455/456.3 |
| 6,678,535 | B1 * | 1/2004 | Narayanaswami | 455/557 |
| 6,741,927 | B2 * | 5/2004 | Jones | 701/465 |
| 6,898,517 | B1 * | 5/2005 | Froeberg | 701/468 |
| 7,102,670 | B2 | 9/2006 | Seaman et al. | |
| 7,116,988 | B2 * | 10/2006 | Dietrich et al. | 455/456.1 |
| 7,162,254 | B1 * | 1/2007 | Smith | 455/456.3 |
| 7,406,216 | B2 | 7/2008 | Baer et al. | |
| 7,659,848 | B2 | 2/2010 | Dooley et al. | |
| 7,995,999 | B2 * | 8/2011 | Smith | 455/414.3 |
| 8,014,762 | B2 * | 9/2011 | Chmaytelli et al. | 455/414.1 |
| 8,073,461 | B2 * | 12/2011 | Altman et al. | 455/456.1 |
| 8,099,109 | B2 * | 1/2012 | Altman et al. | 455/456.3 |
| 2003/0060212 | A1 | 3/2003 | Thomas | |
| 2004/0150715 | A1 * | 8/2004 | Wilcock et al. | 348/143 |
| 2004/0230452 | A1 | 11/2004 | Abe et al. | |
| 2005/0248444 | A1 * | 11/2005 | Joao | 340/426.13 |
| 2007/0015586 | A1 | 1/2007 | Huston | |
| 2007/0060173 | A1 * | 3/2007 | Ramer et al. | 455/456.3 |
| 2009/0115617 | A1 | 5/2009 | Sano et al. | |
| 2009/0325607 | A1 * | 12/2009 | Conway et al. | 455/456.3 |

FOREIGN PATENT DOCUMENTS

GB 2 397 908 A 8/2004
WO WO 2006/010910 2/2006

OTHER PUBLICATIONS

A Definition of Peer-to-Peer Networking for the Classification of Peer-to-Peer Architectures and Applicaitons, Schollmeier, Rudiger, in Peer-to-Peer Computing, 2001, Proceedings, First International Conference on Linkoping, Aug. 27-29, 2001, (Graham et al. eds.), pp. 101-102.
Extended European search report for corresponding EP application No. 10189790.8-1238 dated Mar. 3, 2011, pp. 1-10.
Darwin Phones: the Evolution of Sensing and Inference on Mobile Phones, Miluzzo et al., Accessed: May 14, 2010, http://www.cs.dartmouth.edu/~tanzeem/pubs/MobiSys2010_Darwin.pdf.

* cited by examiner

*Primary Examiner* — Sharad Rampuria
(74) *Attorney, Agent, or Firm* — Ditthavong Mori & Steiner, P.C.

(57) ABSTRACT

An approach is provided for determining the existence of an event based on information collected from mobile devices. Reception is caused, at least in part, of media from a plurality of mobile devices. A plurality of event vectors for the respective mobile devices is determined. Each of the event vectors includes geo-location information and timing information of the corresponding mobile device. The existence of the event is determined based on the received media and the event vectors.

19 Claims, 13 Drawing Sheets

METHOD AND APPARATUS FOR MOBILE ASSISTED EVENT DETECTION AND AREA OF INTEREST DETERMINATION

BACKGROUND

Service providers (e.g., wireless, cellular, etc.) and device manufacturers are continually challenged to deliver value and convenience to consumers by, for example, providing compelling network services. Important differentiators in the industry are application and network services that offer entertainment and location services. In particular, advertisements such as website banners are utilized to disseminate information about upcoming events. Traditionally, these advertisements are limited to events that are known at the time the advertisements were created.

SOME EXAMPLE EMBODIMENTS

Therefore, there is a need for an approach for automatically determining events based on information collected from mobile devices.

According to one embodiment, a method comprises causing, at least in part, reception of media from a plurality of mobile devices. The method also comprises determining a plurality of event vectors for the respective mobile devices. Each of the event vectors includes geo-location information and timing information of the corresponding mobile device. The method further comprises determining existence of an event based on the received media and the event vectors.

According to another embodiment, an apparatus comprising at least one processor, and at least one memory including computer program code, the at least one memory and the computer program code configured to, with the at least one processor, cause, at least in part, the apparatus to cause, at least in part, reception of media from a plurality of mobile devices. The apparatus is also caused to determine a plurality of event vectors for the respective mobile devices. Each of the event vectors includes geo-location information and timing information of the corresponding mobile device. The apparatus is further caused to determine existence of an event based on the received media and the event vectors.

According to another embodiment, a computer-readable storage medium carrying one or more sequences of one or more instructions which, when executed by one or more processors, cause, at least in part, an apparatus to cause, at least in part, reception of media from a plurality of mobile devices. The apparatus is also caused to determine a plurality of event vectors for the respective mobile devices. Each of the event vectors includes geo-location information and timing information of the corresponding mobile device. The apparatus is further caused to determine existence of an event based on the received media and the event vectors.

According to another embodiment, an apparatus comprises means for causing, at least in part, reception of media from a plurality of mobile devices. The apparatus also comprises means for determining a plurality of event vectors for the respective mobile devices. Each of the event vectors includes geo-location information and timing information of the corresponding mobile device. The apparatus further comprises means for determining existence of an event based on the received media and the event vectors.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining the existence of an event based on information collected from mobile devices are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
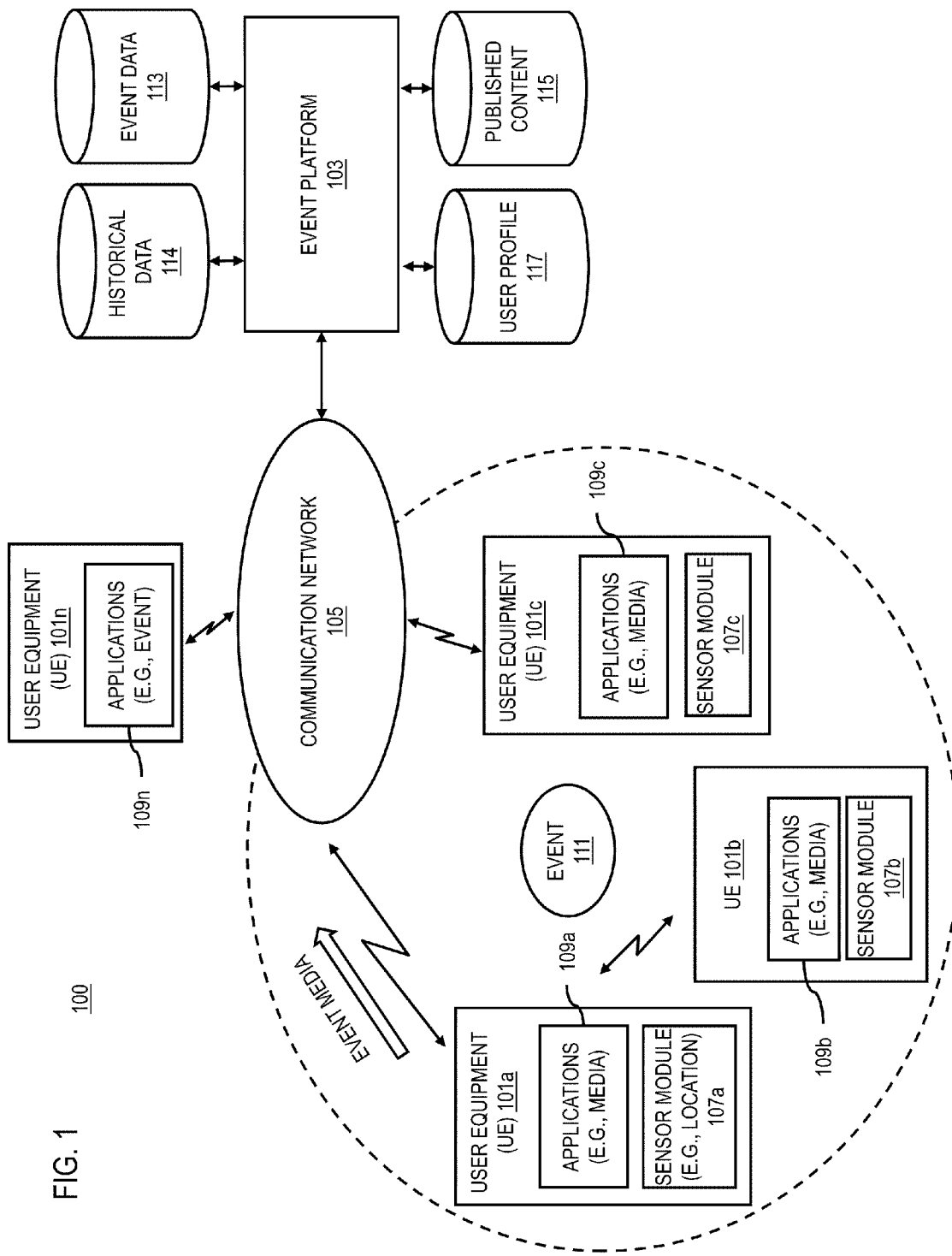
FIG. 1 is a diagram of a system capable of determining the existence of an event based on event vectors, according to one embodiment.

FIG. 1 is a diagram of a system capable of determining the existence of an event, according to one embodiment. In a mobile world, an increasing number of services and applications are targeted at providing social services (e.g., advertisements) to inform users of events. In certain embodiments, events may be occurrences that may be interesting to a user of the service. These events are known to the social service prior to the event and may allow users of the service to define the event to provide details and background information about the event. Further, these services may allow for users to mark the event on a map or otherwise associate the event with a specific location in the respective service itself or in a dedicated location or navigation service. Events information may also automatically update the user's electronic calendar, so that the user could be reminded in time about an occurring event. However, these services generally rely on users to actively provide information about the event. In other words, unless at least one user of a service manually enters information about an event in the service, the service (and other users of the service) would receive no information or notification of the event over the service. Moreover, the burden of manual entry of event information may discourage users from providing specific information about an event even if the users so desire. It is noted that many users of services participate in the various services to stay informed of new events without the need for users to actively provide information and, therefore, may be reluctant to provide event information.

In recognition of this problem, a system 100 of FIG. 1 introduces the capability to automatically determine the existence of an event based on information collected from mobile devices (e.g., user equipment (UE) 101a-101c). In one embodiment, the UEs 101a-101c capture media (e.g., photos, video clips, etc.) and transmit the media content and related information (e.g., location information) to an event platform 103 via a communication network 105. The media can be captured, for instance, to explicitly transmit information about the event or may be captured for other purposes (e.g., sightseeing, general interest, etc.) but then co-opted for use in the approach described herein. The media is analyzed to determine information about the existence of an event which can be transmitted to the UEs 101a-101c.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 may include a sensor module 107a-107c to determine the information (e.g., location) of the UE 101. The sensor module 107 may be utilized by one or more applications 109 (e.g., media applications 109a-109c, event applications 109n, etc.). The system 100 has been simplified for to include three UEs 101a-101c to capture the event, however, it is contemplated that any multiple number of UEs 101 (e.g., more than two UEs 101) can be utilized in capturing information about the event.

The UEs 101a-101c may utilize respective media applications 109 to capture media of an event 111 as well as the location, via a location sensor of the sensor module 107, and other information about the UE 101 during the event. In certain embodiments, the event may include a static event (e.g., a normal occurrence such as media capture around a monument), a sudden incident (e.g., a spontaneous occurrence such as an accident or an impromptu folk festival that users determine is a good reason to capture media), a special event (e.g., an occurrence that is indicated to be more important by the event platform 103 based on certain criteria), a combination thereof, or the like. Once media is captured, the UE 101 may form an event vector regarding the event to transmit to the event platform 103. In certain embodiments, an event vector is one or more data items or information (e.g., media, location, date, time, etc.) that may be an indicator of an event or the occurrence of an event from the perspective of a single UE 101a. The event platform 103 can automatically determine or infer information on the occurrence of an event or other event related information by evaluating one or more of the event vectors received from one or more UEs 101a-101c. By way of example, an event vector is transmitted as a data structure of information. In some embodiments, the event vector includes geo-location information about the UE 101, timing information (e.g., when the media was captured, current time, etc.), magnetometer information (e.g., the relationship of a face of the UE 101 to the magnetic north pole) to determine a heading or orientation of the UE 101 that may be associated with a location of the event, accelerometer information (e.g., to determine the angle of the face of the UE 101 from the ground) which may also used to determine the location of the event, an identifier distinguishing the UE 101a-101c, the captured media, a combination thereof, etc. The event vector may be utilized to determine one or more focal points of a plurality of UEs 101 by using the location and orientation of each of multiple UEs 101 (e.g., the intersection of the orientation or views of the UEs 101). This focus may be determined to be a center or other important point of the event. In one scenario, the event vector is separated from the media to conserve bandwidth when transmitting the event vector to the event platform 103. Under this scenario, the event vectors may be transmitted in real time or near real time while the actual media is streamed or transmitted at a later time. Moreover, a media application 109 may include options as to participate or not participate in a service provided by the event platform 103 to determine the existence of events and/or publish media of the user of the application 109. In certain embodiments, to encourage participation, the user may be recognized or compensated if the user's media is presented to other users.

The event platform 103 may receive the event vectors and the media from UEs 101 and store the information in one or more databases. The event vectors can be stored in an event data database 113. The event data database 113 may be utilized to store current and historical data about events. Moreover, the event platform 103 may have access to additional historical data (e.g., historical sensor data or additional historical information about a region that may or may not be associated with events) in a historical data database 114. The events or historical data may be sorted using the geo-location of the UEs 101 or a determined geo-location of the event. Further, the media may be stored in a published content database 115 that may be used to store current and prior event media and publish the content to other UEs (e.g., UE 101n) utilizing an event application 109n. The event platform 103 may additionally extract an identifier associated with a particular UE 101 from a received event vector and associate the user and/or UE 101 with a profile in a user profile database 117. The user profile database 117 may be utilized to collect historical event information about a particular UE 101 or user. This data may be used in heuristically determining the occurrence of an event.

The event vectors can then be processed by the event platform 103 to determine the existence of one or more events associated with the UEs 101. A corollary can be made that if multiple users are capturing media directed at a location, there is a greater probability that there is an event happening at the location. The event vectors may then be compared with historical events and/or other historical information (e.g., a classification, such as rural or urban, of a region associated with the location may be utilized to make general determinations about events or utilization of other sensor information that has not been classified as an event) that have occurred in one or more regions associated with the location as further detailed in FIGS. 4 and 5 to heuristically determine whether an event is currently taking place at the location. Further, the event vectors may be utilized to determine an area of extent of the event as well as structural information (e.g., a physical information such as whether the event is occurring in the sky, if the event is on a stage facing a particular direction, etc.) of the event as further detailed in FIG. 6. Once the existence of one or more events has been determined, the event platform 103 may transmit event information to UEs that are monitoring for such event or information or are nearby the location of the respective events.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

By way of example, the UE 101 and event platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the UE 101 and event platform 103 interact according to a client-server model. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
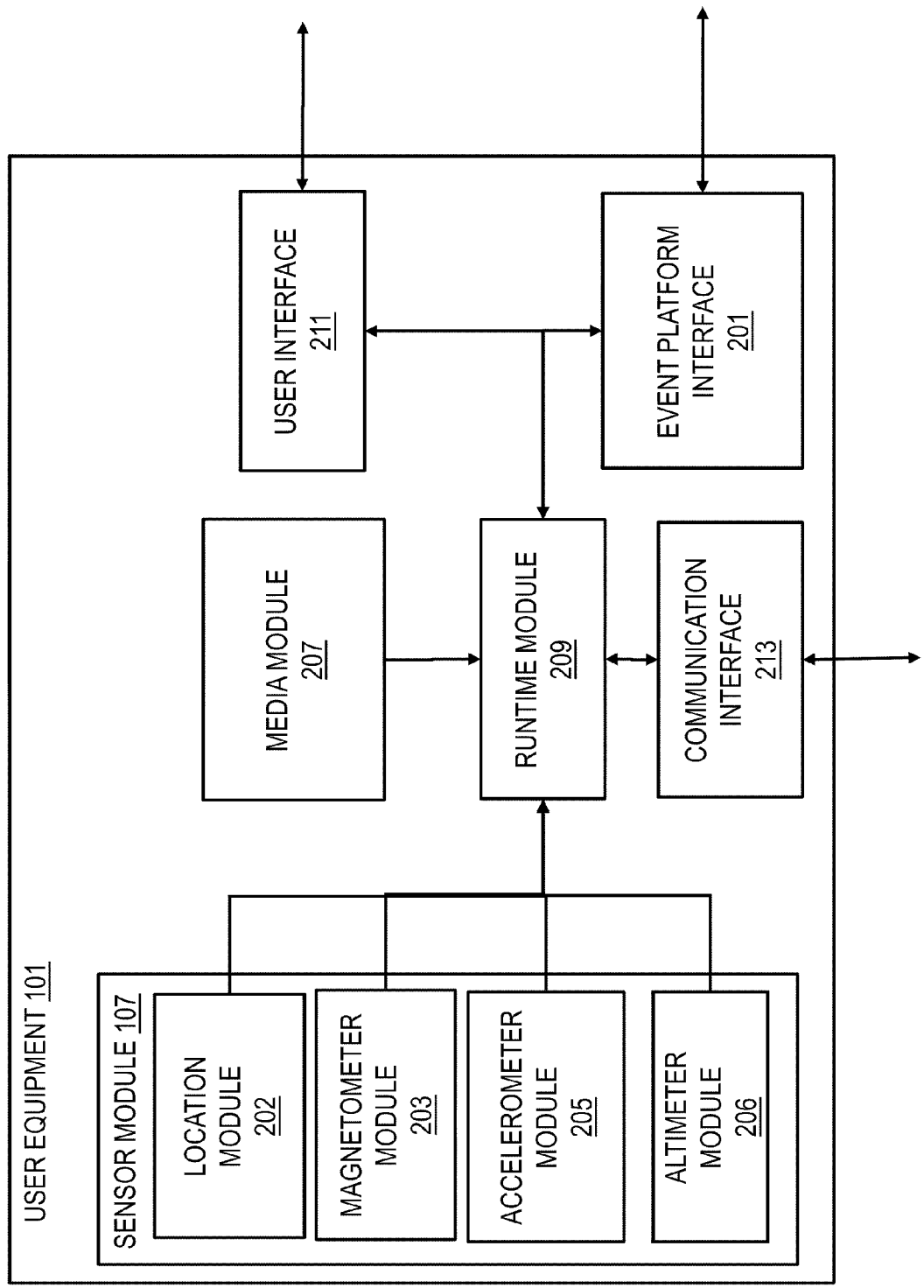
FIG. 2 is a diagram of the components of a user equipment, according to one embodiment.

FIG. 2 is a diagram of the components of a UE 101, according to one embodiment. By way of example, the UE 101 includes one or more components for collecting and transmitting event vectors. It is contemplated that the functions of these components may be combined in one or more components or performed by other components of equivalent functionality. In this embodiment, the UE 101 includes an event platform interface 201 to communicate with an event platform 103, a sensor module 107 that includes a location module 202 to determine the location of a UE 101, a magnetometer module 203 to determine horizontal orientation of the UE 101, an accelerometer module 205 to determine vertical orientation of the UE 101, an altimeter module 206 to determine altitude, and other sensor modules (not shown), a media module 207 that may be used to capture media, a runtime module 209 to execute applications on the UE 101, a user interface 211, and a communication interface 213. Information from the location module 202, magnetometer module 203, accelerometer module 205, and media module 207 may be used to determine the direction or vector along which the UE 101 is aligned when, for instance, capturing event related media or information (e.g., the direction or vector along which a camera of the UE 101 is pointed when capturing an image of an event). In this way, the UE 101 may generate and transmit an event vector to an event platform 103 that includes the directional and location information. Further, the UE 101 may embed the event vector in media transmitted to the event platform 103 to determine the existence of an event.

The event platform interface 201 is used by the runtime module 209 to communicate with an event platform 103. In some embodiments, the interface is used to upload media and event vectors for processing at the event platform 103. Further, the event platform interface 201 may be utilized by an event application 109 to receive event information from the event platform 103. In certain embodiments, the event information includes a determination that an event 111 is occurring, an extent of the event 111, a face of the event 111, a structure of the event 111, a type of the event 111, or a combination thereof. In certain embodiments, the face of the event 111 is the direction of a focus point of the event 111 points towards. As such, the face of the event 111 may be the outward presentation of the event that the UEs 101 capture media regarding the event from. The location module 202, magnetometer module 203, accelerometer module 205, and media module 207 may be utilized to create event vectors to transmit to the event platform 103.

Moreover, in certain embodiments, UEs 101 may additionally communicate with other UEs 101 and devices via the communication interface 213. In these scenarios, information may be transmitted between UEs 101 via a peer-to-peer network topology. The UE 101 communicates with other UEs 101 utilizing a media application 109 or an event application 109 based on proximity to the other UEs 101. In another embodiment, a first UE 101b may utilize a second UE 101a as a conduit to communicate with the event platform 103. In this scenario, the second UE 101a may collect information (e.g., event vectors and/or media) from the first UE 101b and upload the information to the event platform 103. In one embodiment, the second UE 101 that acts as a conduit for the first UE 101 is a "master peer" UE 101 that has been designated by the event application 109 or the event platform 103. By way of example, the master peer UE 101 collects media, event vectors, and/or other event related information from other neighboring or peer UEs 101 to upload to the event platform 103. In this embodiment, the UEs 101 that are not a master peer 101 do not communicate directly with the event platform 103. This may be useful when there is a crowd of UEs 101 (which may regularly occur during an event) and the network is a bottleneck or congested because of the crowd. The designation of a master peer UE 101 enables the event platform 103 to advantageously reduce the number of communication links between the event platform 103 and the community of UEs 101 reporting on one or more events, thereby reducing the overall resource burden (e.g., network bandwidth, available communication channels, etc.) on the communication network 105.

In one embodiment, the location module 202 can determine a user's location. The user's location can be determined by a triangulation system such as a global positioning system (GPS), assisted GPS (A-GPS) A-GPS, Cell of Origin, wireless local area network triangulation, or other location extrapolation technologies. Standard GPS and A-GPS systems can use satellites to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 202 may also utilize multiple technologies to detect the location of the UE 101. GPS coordinates can provide finer detail as to the location of the UE 101. The location module 202 may be utilized by the media application 109 to capture location information as part of an event vector to transmit to the event platform 103.

The magnetometer module 203 can include an instrument that can measure the strength and/or direction of a magnetic field. Using the same approach as a compass, the magnetometer is capable of determining the direction of a UE 101 using the magnetic field of the Earth. The front of a media capture device (e.g., a camera of the media module 207) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is stored in an event vector when media is captured. This directional information may be correlated with the location information of the UE 101 and other UEs 101 to determine a focus point (e.g., where multiple vectors associated with the determined locations cross paths) for the event 111.

Further, the accelerometer module 205 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In one embodiment, vertical directional data obtained from an accelerometer is stored in the event vector when media is captured.

Moreover, the altimeter module 206 may be utilized to determine the altitude of the UE 101 during the event. Altitude information may be included in the event vector to determine a vantage of the user while capturing media. Moreover, altitude information may be used to determine events happening at a single longitude and latitude location, but at a different elevation (e.g., on a roof of a building, edge of a cliff, etc.). In certain embodiments, the altimeter module 206 includes a pressure altimeter that determines barometric pressure to determine the altitude. In another embodiment, the UE 101 may include a temperature sensor that is used to infer altitude based on the ambient temperature (e.g., temperature decreases at known rate with increasing altitude). In addition or alternatively, GPS information may be utilized to determine altitude information.

Media can be captured using a media capture device associated with the media module 207. A media capture device may include a camera, an audio recorder, a video camera, a combination thereof, etc. In one embodiment, visual media is captured in the form of an image or a series of images. The media module 207 can obtain the image from a camera and embed the image within an event vector also containing location data, timing data, and orientation data. Moreover, the event vector may additionally include air-pressure sensor data, temperature sensor data, other such sensor data, or a combination thereof.

Information that is collected to transmit to the event platform 103 may be controlled and viewed using the user interface 211, which can include various methods of communication. For example, the user interface 211 can have outputs including a visual component (e.g., a screen), an audio component (e.g., a verbal instructions), a physical component (e.g., vibrations), and other methods of communication. User inputs can include a touch-screen interface, microphone, camera, a scroll-and-click interface, a button interface, etc. Further, the user may input a request to start a media application 109 and utilize the user interface 211 while capturing media. Additionally or alternatively, the UE 101 may include an event application 109 that can be presented using the user interface 211. Utilizing the user interface 211, the user may select to view one or more views of the event 111 and/or request that events nearby the user be presented to the user.

Figure 3:
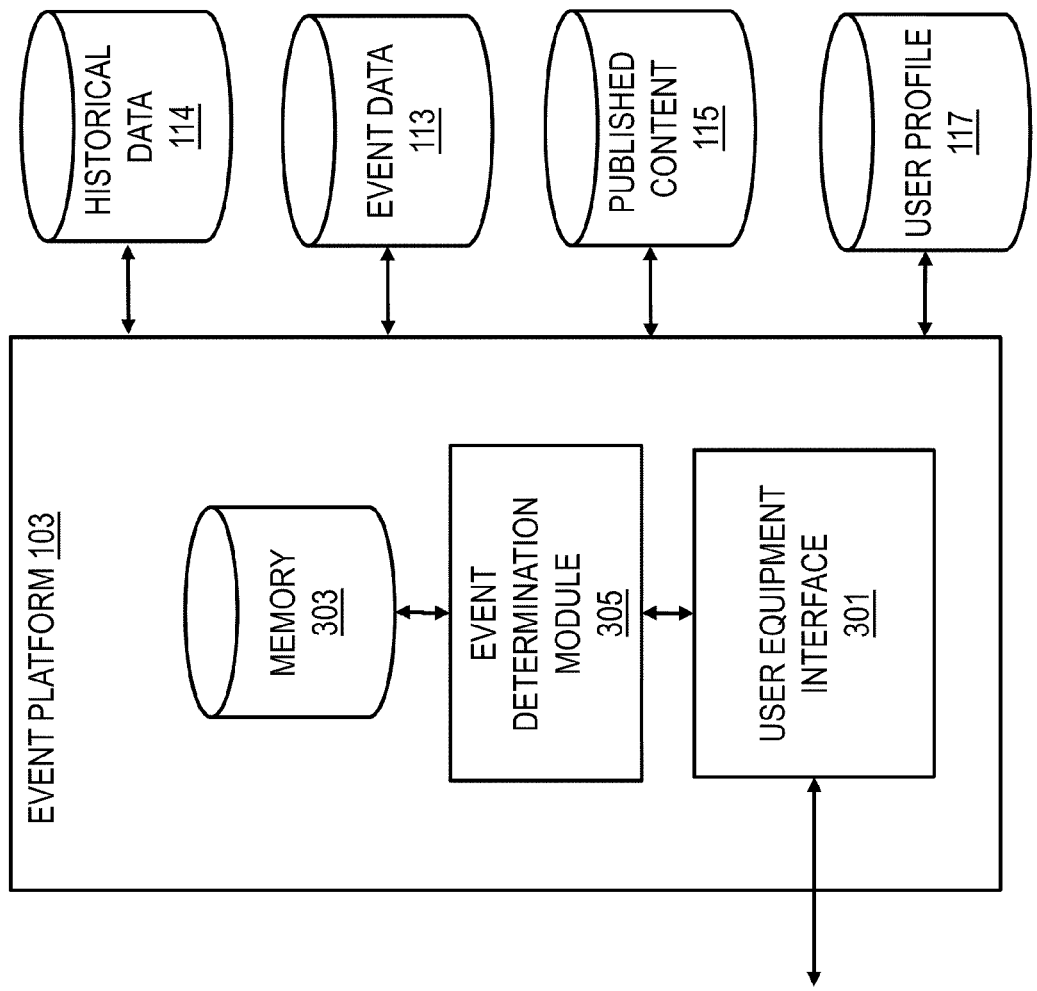
FIG. 3 is a diagram of the components of an event platform, according to one embodiment.

FIG. 3 is a diagram of the components of an event platform 103, according to one embodiment. By way of example, the event platform 103 includes one or more components for determining the existence of an event 111, the extent of the event 111, and publishing media about the event 111. It is contemplated that the functions of these components may be combined in one or more components or performed by other components of equivalent functionality. In one embodiment, the event platform 103 includes a user equipment interface 301, a memory 303, and an event determination module 305.

The event determination module 305 receives communications (e.g., media content, event vectors, etc.) from a UE 101 via the user equipment interface 301. The event determination module 305 can store appropriate communications such as media content in a published content database 115. Further, the event determination module 305 may receive event vectors associated with one or more events and store the vectors in an event data database 113. Moreover, the event determination module 305 may associate one or more of the event vectors with particular users and update a user profile database 117 of the behavior of the user. A user profile may be created for a user of the media application 109 when the user registers with the event platform 103. The user profiles may be updated when the user transmits content to the event platform 103. The event data database 113, historical data database 114, and the user profile database 117 may be utilized to make a heuristic determination of the existence and extent of an event 111 based on a comparison of the historic information and current event vectors for a location as further detailed in FIGS. 4-6. Once the existence of the event 111 is established, the event platform 103 may determine and transmit event information about the event 111 to users of an event application 109. In certain embodiments, the users of the event application 109 may request and provide location information of the user to receive customized event information as further detailed in FIG. 8. This event information may be transmitted to the user of the event application 109 using the user equipment interface 301.

Figure 4:
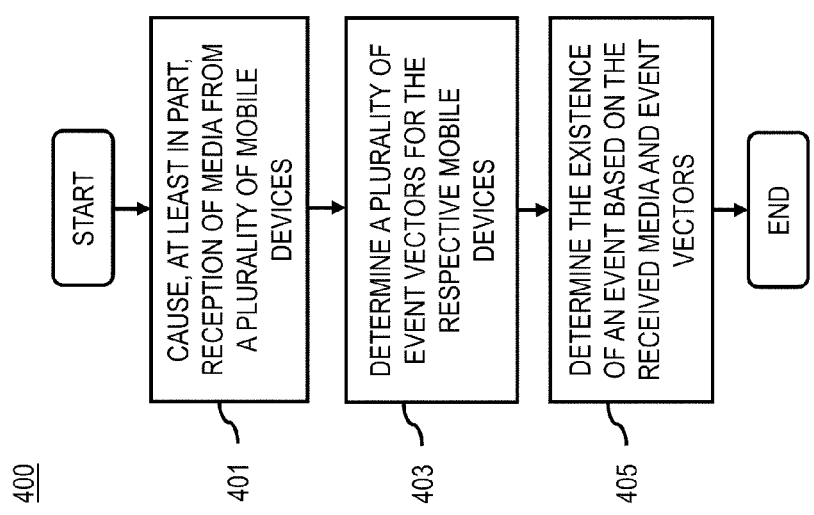

FIG. 4 is a flowchart of a process for determining the existence of an event using mobile devices, according to one embodiment. In one embodiment, the event determination module 305 performs the process 400 and is implemented in, for instance, a chip set including a processor and a memory as shown FIG. 12. In step 401, the event determination module 305 is caused, at least in part, to receive media from a plurality of UEs 101 (e.g., mobile devices). The reception of the media may additionally include reception of a plurality of event vectors associated with the UEs 101. Further, prior to receiving the media, the UEs 101 may authenticate with the event platform 103 using a registered identifier (e.g., a user name and password, a device identifier (e.g., a subscriber identity module (SIM), a unique identifier tied to a UE 101, etc.).

Then, at step 403, the event determination module 305 determines a plurality of event vectors for the respective UEs 101 (e.g., by extracting the event vectors for the media or related information transmitted from the UE 101). As mentioned above, the event vectors may include geo-location information (e.g., GPS coordinates), timing information, magnetometer information, accelerometer information, altimeter information, air pressure information, user identifier information, other such available and suitable sensor information, or a combination thereof. The event vectors may be determined by extracting information from a transmission from the respective UEs 101. In certain embodiments, the event vectors are extracted from the received media, which may have been stored in metadata of the media. In other embodiments, the event vectors are received directly from the UEs 101.

Next, the event determination module 305 determines the existence of an event based on the received media and the event vectors (step 405). The event vectors may be compared with historical information from an event data database 113 and a user profile database 117 of mobile users utilizing media applications 109 in particular regions. Correlating the current event vectors with the historical information allows for the detection of the event as further detailed in the processes of FIG. 5. An event vector may be considered current if timing information (e.g., a timestamp) associated with the event vector is within a certain time range of the time the determination is executed. Location and orientation data of the UEs 101 capturing media can be extrapolated to further yield area of interest information and the focal point of the event as further detailed in FIGS. 6 and 7. Once it is determined that a UE 101 is partaking in an event, the user may be queried to describe the event. In this manner, multiple UEs 101 may be utilized to describe the event. Moreover, because the event determination module 305 can associate each UE 101 with a particular event, the event may be labeled with more than one describing identifier. This approach advantageously allows users of the event platform 103 to receive description information about the event without fragmentation of the event (e.g., multiple instances of the same event being described by the event platform 103).

Figure 5:
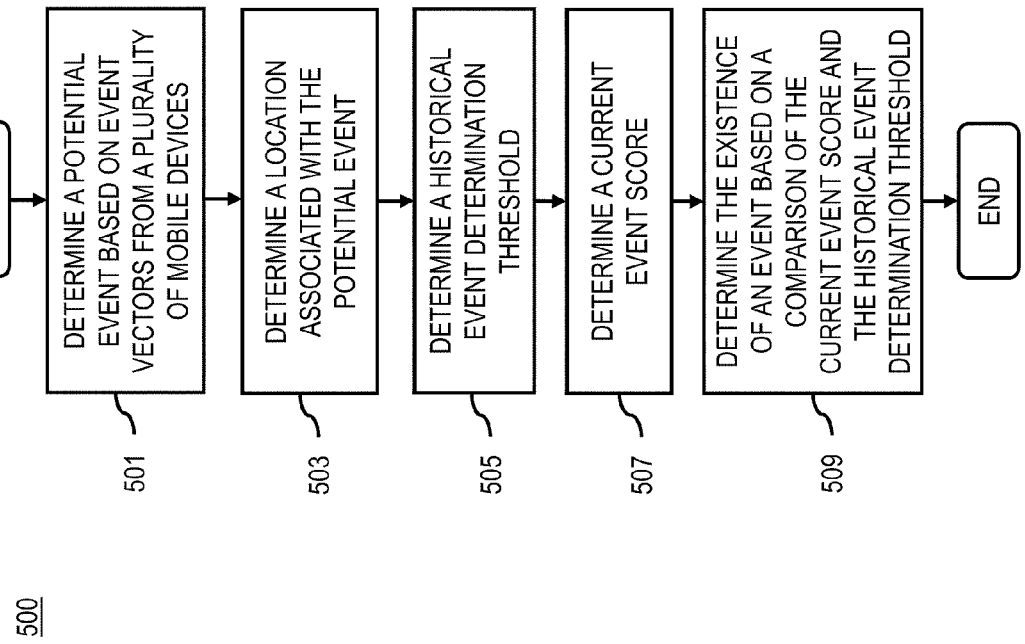
FIGS. 4 and 5 are flowcharts of processes for determining the existence of an event using mobile devices, according to one embodiment.

FIG. 5 is a flowchart of a process for determining the existence of an event using mobile devices, according to one embodiment, according to one embodiment. In one embodiment, the event determination module 305 performs the process 500 and is implemented in, for instance, a chip set including a processor and a memory as shown FIG. 12. In step 501, the event determination module 305 determines a potential event may be occurring based on event vectors and/or media received from a plurality of mobile devices. As noted above, the event vectors may include geo-location information (e.g., GPS coordinates), timing information, magnetometer information, accelerometer information, user identifier information, or a combination thereof. When the event vectors and media are received, each of the event vectors may be mapped to geographic locations based on the geo-location information. Then, the event determination module 305 can collate the information to group event vectors together to determine one or more locations or areas associated with the potential event (step 503). In one embodiment, the grouping of the event vectors is based on a common location, time, etc. of the various event vectors received from the various mobile devices (e.g., UEs 101). This localized grouping of event vectors may then be analyzed to determine the existence of the event by, for instance, determining one or more focal or convergence points of the vectors. The focal point(s) represents the location(s) in space (e.g., two-dimensional or three-dimensional space) where the UEs 101 are pointed when capturing media related to the event. Accordingly, the focal point(s) are likely to be where the event is occurring. In one embodiment, the existence of a potential event may be determined or inferred if there is greater than a certain amount of UEs 101 capturing media in a certain area. The threshold value for the amount can be varied to increase or decrease the sensitivity with which the event determination module 305 can make an event determination. For example, the threshold value for the amount may be set at a low value to more easily trigger an analysis of whether an event is occurring. Also, the amount of information transmitted could be a trigger for detecting an event. For example, one or more UEs 101 capturing a large volume of media may indicate the occurrence of an event in a certain place (e.g., a car accident).

The event determination module 305 may collect data about the event as well as historical events in an event data database 113 and information about users of the service in a user profile database 117. Using historical information, the event determination module 305 can determine a historical event determination threshold (step 505). In one embodiment, this threshold represents a score that is to be exceeded to determine that an event exists. By way of example, the score is based on historical information related to events that have occurred at a particular location in the past and/or other historical information (e.g., sensor information from UEs 101 that are not determined to be associated with events). The score may represent, for instance: (1) the number or density of different UEs 101 that have provided event vectors for a particular grouping of related event vectors (e.g., the number of different UEs for a certain area associated with the grouping); (2) the number of different UEs 101 utilized in capturing the potential event; (3) the number of similar events held in the past; (4) popularity of the area associated with the grouping with the different UEs 101; (5) the volume of media data transmitted from a certain location or region; and the like. The threshold may be different for different regions with different properties. For example, different thresholds may be determined for commercial areas, residential areas, industrial areas, urban areas, rural areas, etc. In one scenario, in a residential area, the threshold for the existence of an event may be higher than in a commercial area to filter out smaller events (e.g., a small family gathering). Moreover, the event determination module 305 may set a higher threshold for a region if static events regularly occur. For example, more people may regularly capture media near monuments and museums and thus, a higher threshold is needed to determine that there is an event occurring at a monument or museum outside of the normal events. Further, in rural areas, where there is little media capture in general, a lower threshold value may be utilized. In certain embodiments, the threshold may be associated with a density of the users in an area surrounding the location of the potential event. In other embodiments, the threshold is based on a number of UEs 101 determined to be at the event. Moreover, in additional embodiments, the threshold is based on the volume of media data transmitted from a certain location or region.

After determining the threshold score, a score may be determined for a potential event under current evaluation based on the event vectors and media received from the UEs 101. The total score may represent a number of UEs 101 or a density of UEs 101 for an area associated with the potential event and the score may be raw or weighted. Each individual UE 101 may be associated with a base score. Then, each score may be adjusted or weighted based on a user profile associated with the UE 101. For example, if a user regularly captures media in a single place, the user profile database 117 may collect this information and weight the user's score lower than the base score because this activity may indicate that the user is capturing media for a different reason (e.g., capturing media at home, capturing media for work purposes, etc.) than because of an event. Moreover, the base score may be increased based on a determination that the user actively captures media at different events based on a heuristic analysis of the user's past activity. Once a score is determined for each UE 101, the scores may be combined into a current event score (step 507). In certain embodiments, only scores considered "current" may be utilized in determining the event score. What is considered "current" may be determined based on a predetermined time span associated with historical information about events in the region. Thus media may be considered current if the media is captured within the time span. In certain embodiments, this score may be adjusted into a density score (e.g., based on an area associated with the size of the event). This density score may be utilized to determine if there is a single event occurring in the area or multiple smaller events occurring in the area of the potential event.

Next, at step 509, the existence of the event is determined based on a comparison of the score and the historical event determination threshold. If the score exceeds the threshold, it is determined that there is an existing event because historical information leads to the likelihood that there is an event in existence if the threshold is exceeded. The existence of an event may trigger additional determinations about the event as further described in FIGS. 6-9, such as the extent of the event and selecting media associated with the event to publish.

Figure 6:
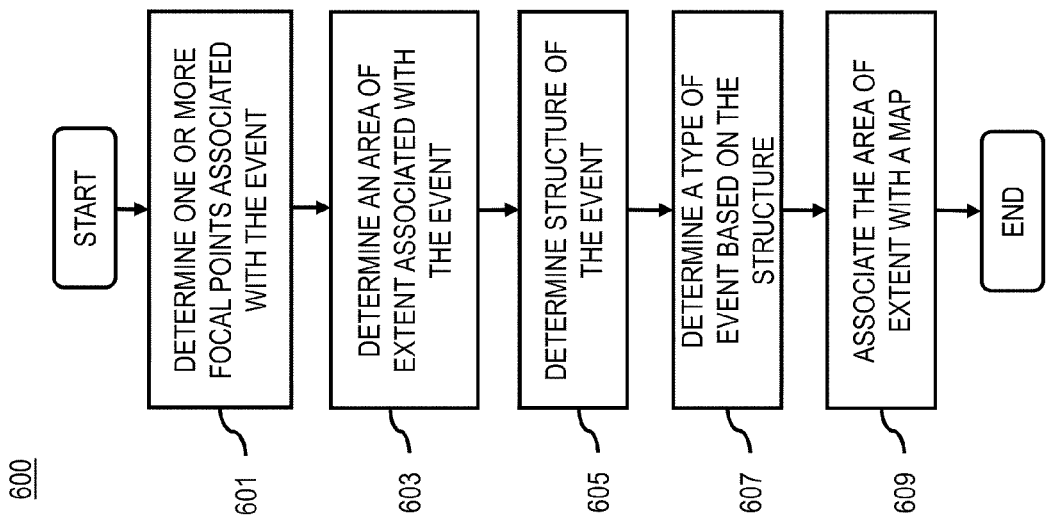
FIG. 6 is a flowchart of a process for determining event extent information utilizing mobile devices, according to one embodiment.
Figure 7:
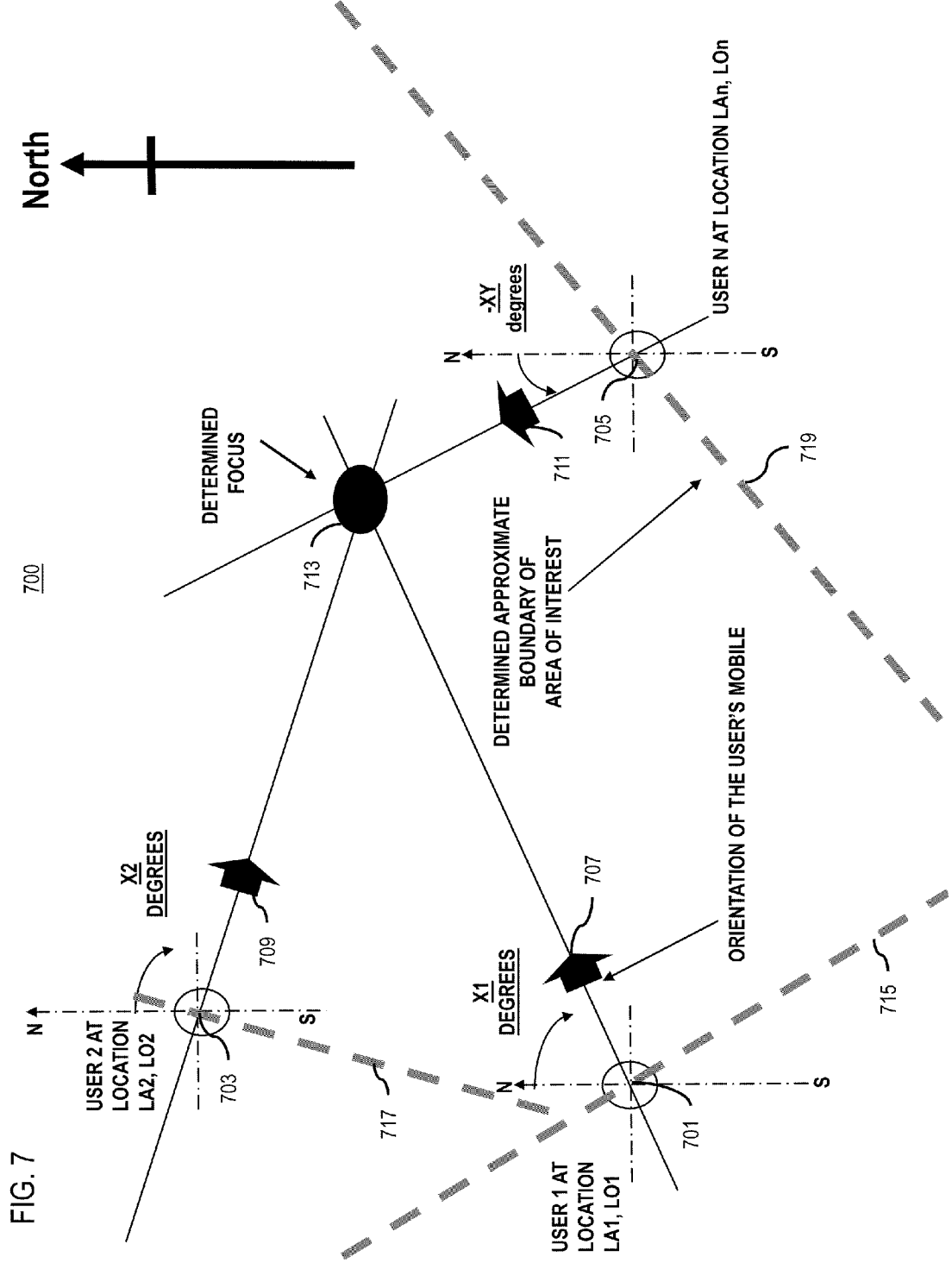
FIG. 7 is a map diagram displaying an example map of the locations of users used to determine area of extent information, according to one embodiment.

FIG. 6 is a flowchart of a process for determining event extent information utilizing mobile devices, according to one embodiment. In one embodiment, the event determination module 305 performs the process 600 and is implemented in, for instance, a chip set including a processor and a memory as shown FIG. 12. In step 601, the event determination module 305 determines a focal point associated with the event based on the event vectors. As noted previously, the event vectors may include orientation information associated with magnetometers and accelerometers as well as location information. The determination of the focal point may be further described utilizing the map 700 of FIG. 7. The map 700 displays multiple users 701, 703, 705 utilizing UEs 101 to transmit event information to the event platform 103. The magnetometer information may be utilized to determine an angle with respect to north. This angle can be utilized to determine vectors 707, 709, 711 pointing towards a location that the user is interested in capturing media about from the user's location 701, 703, 705. The user's location 701, 703, 705 may be stored and utilized using latitude and longitude information. The vectors 707, 709, 711 may be analyzed to determine one or more intersection points, which may be considered a focal point 713. In certain embodiments, there may be more than one focal point 713 associated with a determined event. Further, the location information may include an altitude and the accelerometer data may be utilized to add a three dimensional component to the focal point 713. With this data, the vectors may be analyzed in a three dimensional space. Further, coarse determinations may be made with regard to the accelerometer data (e.g., whether each user has a lower vantage point or a higher vantage point in relation to the focal point 713).

Further, an area of extent associated with the event may be determined (step 603). A perimeter may be determined using orthogonal boundary lines 715, 717, 719. These lines may be orthogonal to the determined vectors 707, 709, 711. Moreover, if there are gaps in the perimeter, the focal point 713 may be utilized to determine the boundary. In other embodiments, the area of extent may be determined to be an area based on a radius from the focal point 713 to the furthest user. Additionally, the structure of the event may be determined (step 605) based on the focal point and the area of extent. For instance, if the focal point 713 is in the sky, it may be determined that the structure of the event is a sky event. Moreover, if the focal point 713 is only captured from a particular side, it can be determined that the event faces a certain direction from the focal point 713 (e.g., the event faces south west from the focal point 713). This structural information may be used to determine a type of event associated with the event (step 607). In this manner, the structure of the event may be determined to be a stage facing the determined direction, a sky event, a stadium event (if it is determined that the UEs 101 have a higher vantage point than the focal point 713), a building event (e.g., if the UEs 101 are within a building) etc. When the focal point 713 is determined and area of extent is determined, the area of extent may be associated with a map (step 609). This map may be utilized to disseminate information about events to the users of the event platform 103. The users may receive this information using the processes of FIG. 8.

Figure 8:
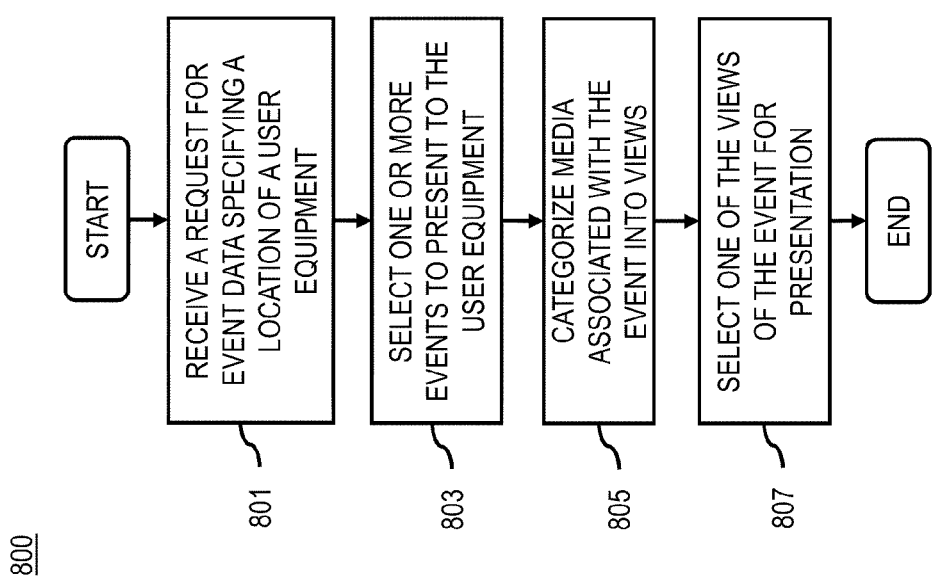
FIG. 8 is a flowchart of a process for determining views of an event for presentation, according to one embodiment.
Figure 9:
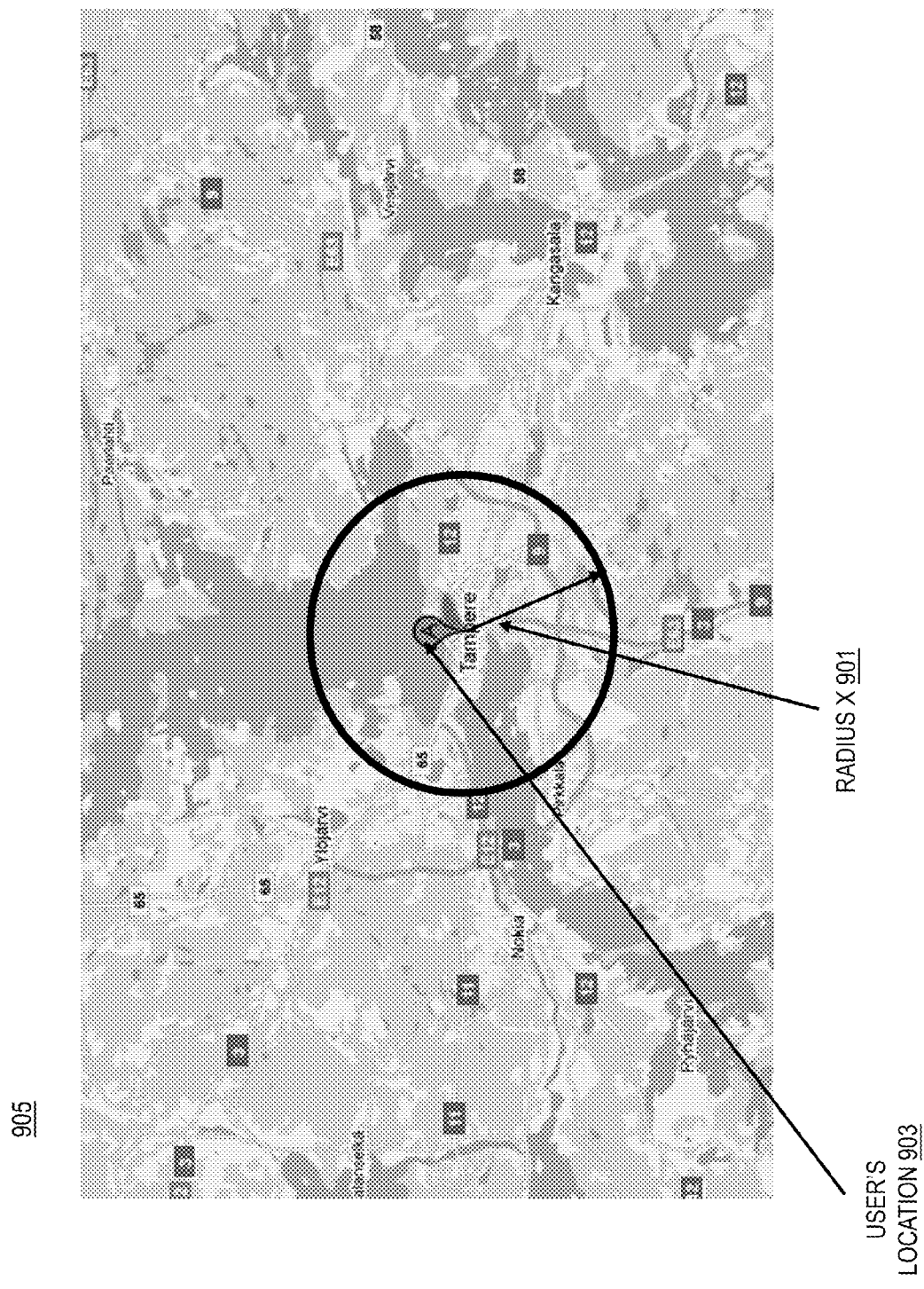
FIG. 9 is a map diagram displaying an example map of the locations of a user utilized to determine, according to one embodiment.

FIG. 8 is a flowchart of a process for determining views of an event for presentation, according to one embodiment. In one embodiment, the event determination module 305 performs the process 800 and is implemented in, for instance, a chip set including a processor and a memory as shown FIG. 12. In step 801, the event determination module 305 receives a request from a UE 101 for event data. The request may include specifying a location of the UE 101. Further the location may be based on a location module 202 associated with the UE 101 or based on input from a user of the UE 101. Further, the user may specify information about what content the user wishes to receive. This information may be stored in a user profile database 117.

When the request is received, the request may be associated with a user profile using authentication procedures. User profile preferences may then be retrieved from the user profile, which may be utilized to select one or more events to present to the UE 101 (step 803). Under one scenario, the selection is based on a radius 901 of the user's location 903 as exemplified in the map image 905 of FIG. 9. If an event is within the radius 901, the user may be presented with information about the event. Further, the user profile may filter events from view based on certain criteria, such as the size of the event or the structure of the event. For example, the size of the event may be determined based on the number of UEs 101 collecting media about the event or based on a density of UEs 101 associated with the event. Moreover, as previously noted, the structure of the event may include information as to whether the event is outside, in the sky, within a building, etc. The user may be able to filter one or more of these types of events from the events the user may wish to view. Then the events may be presented to the user and the user may select an event to view information about from the presented events.

Once the event is selected, the event determination module 305 may determine media to present to the user. The event determination module 305 may categorize media associated with the event into views (step 805). This may be implemented by a publisher that overviews the content. The media may be stored and retrieved from a published content database 115. Further, the publisher may be a component of the event determination module 305 and the views may be customized to the user. Media associated with the event may be categorized based on a quality of the media (e.g., for visual media, the resolution of the media), the type of media (e.g., video, audio, image, etc.), and the vantage point of the user collecting the media. For example, the vantage point may be determined by correlating the location information of the UE 101 associated with the media to the focus point of the event. Certain vantage points may also include whether the user has a view from above, a view from below based on accelerometer information and altitude information associated with the location information. Moreover, the vantage points may be determined based on how close the UE 101 associated with the media was to the focal point when the media was captured. One or more of the views may be offered to the user. A view to present may be selected by the event determination module 305 based on the user profile (step 807). The user profile may indicate a certain bandwidth limitation of the user's UE 101, and/or other preferences that may be used to select the view. When data is determined to be presented to a user, the data is caused to be transmitted to the UE 101 of the user. Then, the data is caused to be presented to the user via a user interface 211 of the UE 101.

Figure 10A:
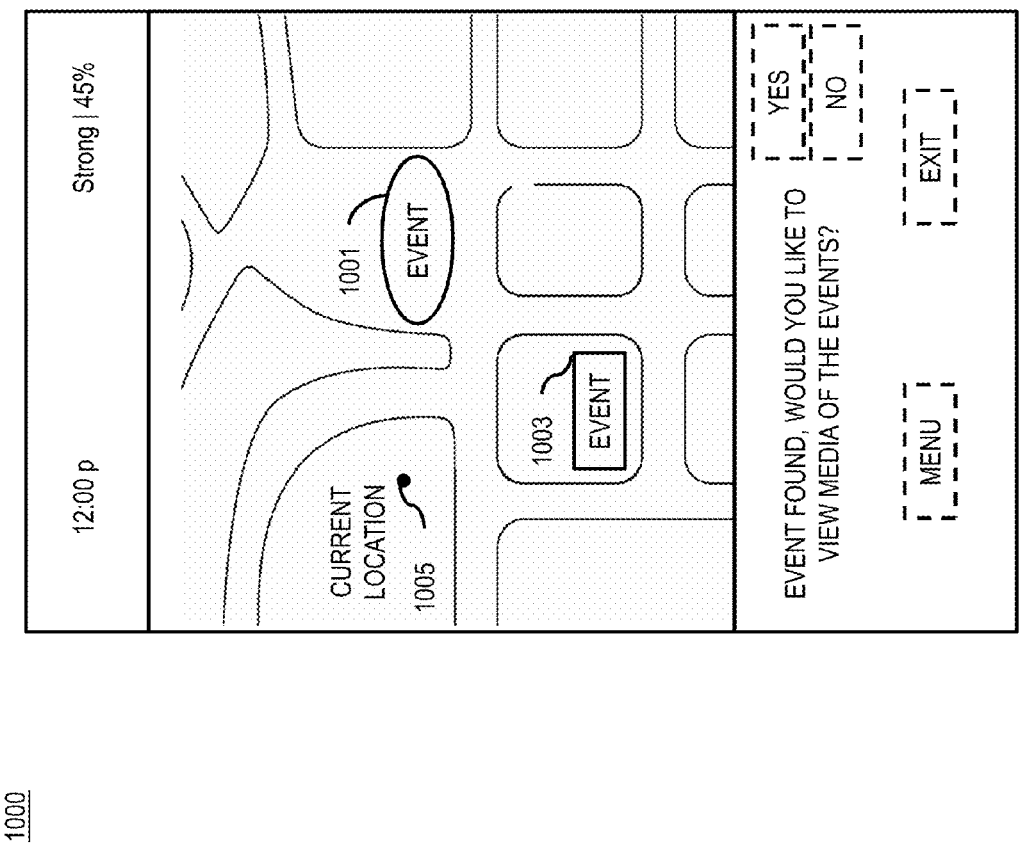
FIGS. 10A and 10B are diagrams of user interfaces utilized in viewing events determined to exist, according to various embodiments.
Figure 10B:
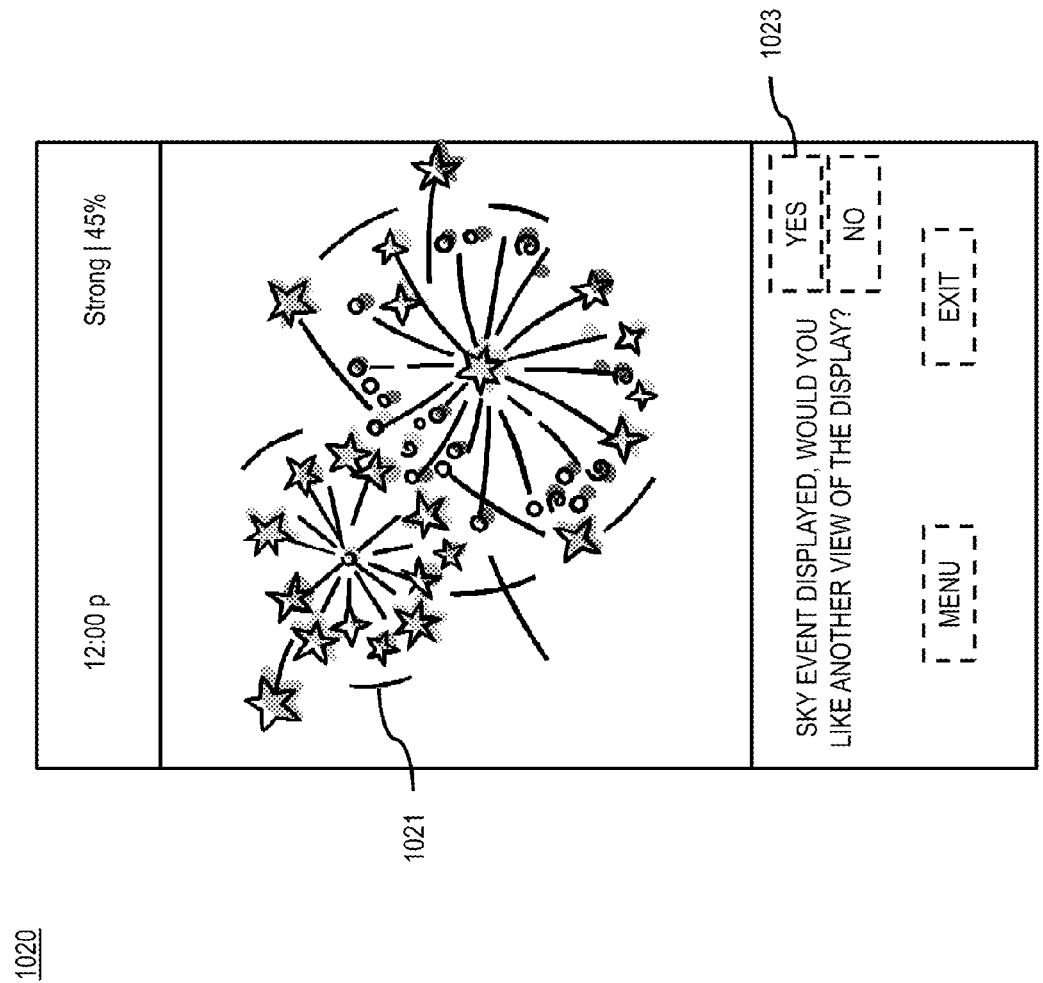

FIGS. 10A and 10B are diagrams of user interfaces utilized in viewing events determined to exist, according to various embodiments. A user of a UE (e.g., UE 101n) may utilize an event application 109n on the user's user interface 1000. The user may be presented with information about one or more events 1001, 1003. Further, the current location 1005 of the user may be presented to provide information about the relationship of the current location 1005 of the user to the event(s) 1001, 1003. Moreover, the user may be able to view media associated with the events 1001, 1003. This media may be selected by the user by entering user preferences. The user preferences may be stored in a user profile database 117 associated with an event platform 103 providing services to the user. Once the user selects to view 1021 an event, a user interface 1020 may present the content to the user. Under one scenario, the event is a fireworks display that may be categorized by the event platform 103 as a sky event. The user may be able to ask for additional views of the event based on user input 1023 or a user profile with preselected preferences. In some scenarios, the preselected preferences may be defaulted to by the event platform 103.

With the above approaches, users are able to receive information about events that other users are associated with. In this manner, spontaneous, unacknowledged, unadvertised, or unscheduled events may be published to the users. This facilitates detection and publishing of unpublicized/niche events, which can add higher value and variety to the consumed content offered to the users. Moreover, this manner of publication may be useful to event promoters because the venue of the event need not invest in additional infrastructure to take advantage of the publishing of the event. Further, the determination of an event may be at a small additional bandwidth cost of associating event vectors to media. Thus, users of media applications 109 may additionally add to the determination of an event associated with the users by merely capturing media in a manner normal to the user. Further, the processing at the UE 101 of the users capturing the media or viewing the event may be minimal because the event platform 103 may perform the major calculations in determining the existence and properties of the event, thus improving battery performance of the UEs 101 while providing the service. As such, the event platform 103 is able to provide the existence and properties of the event to multiple UEs 101.

The processes described herein for determining the existence of an event based on information collected from UEs 101 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
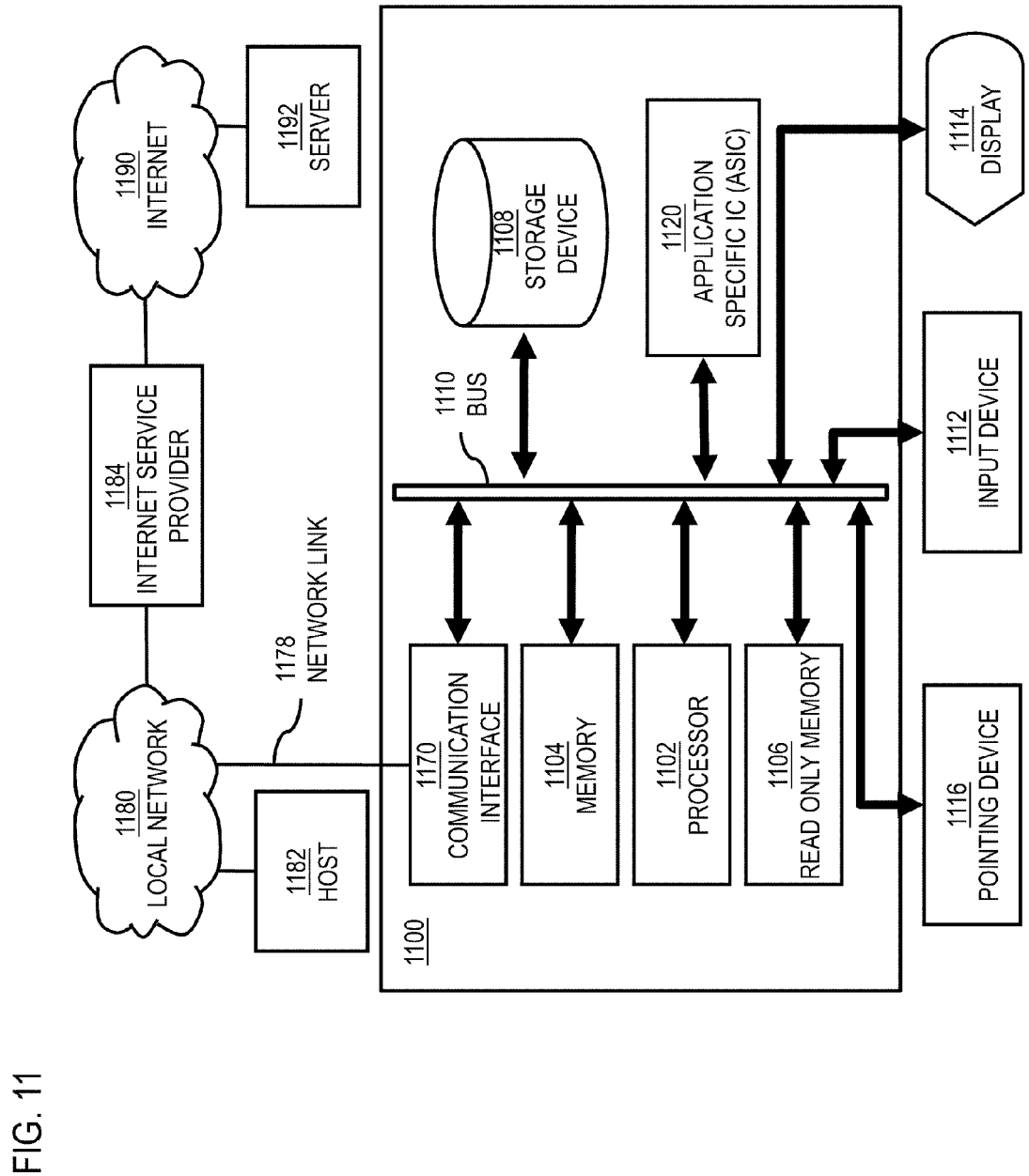
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to determine the existence of an event based on information collected from UEs 101 as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of determining the existence of an event based on information collected from UEs 101.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to determining the existence of an event based on information collected from UEs 101. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for determining the existence of an event based on information collected from UEs 101. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for determining the existence of an event based on information collected from UEs 101, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for to the UE 101.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
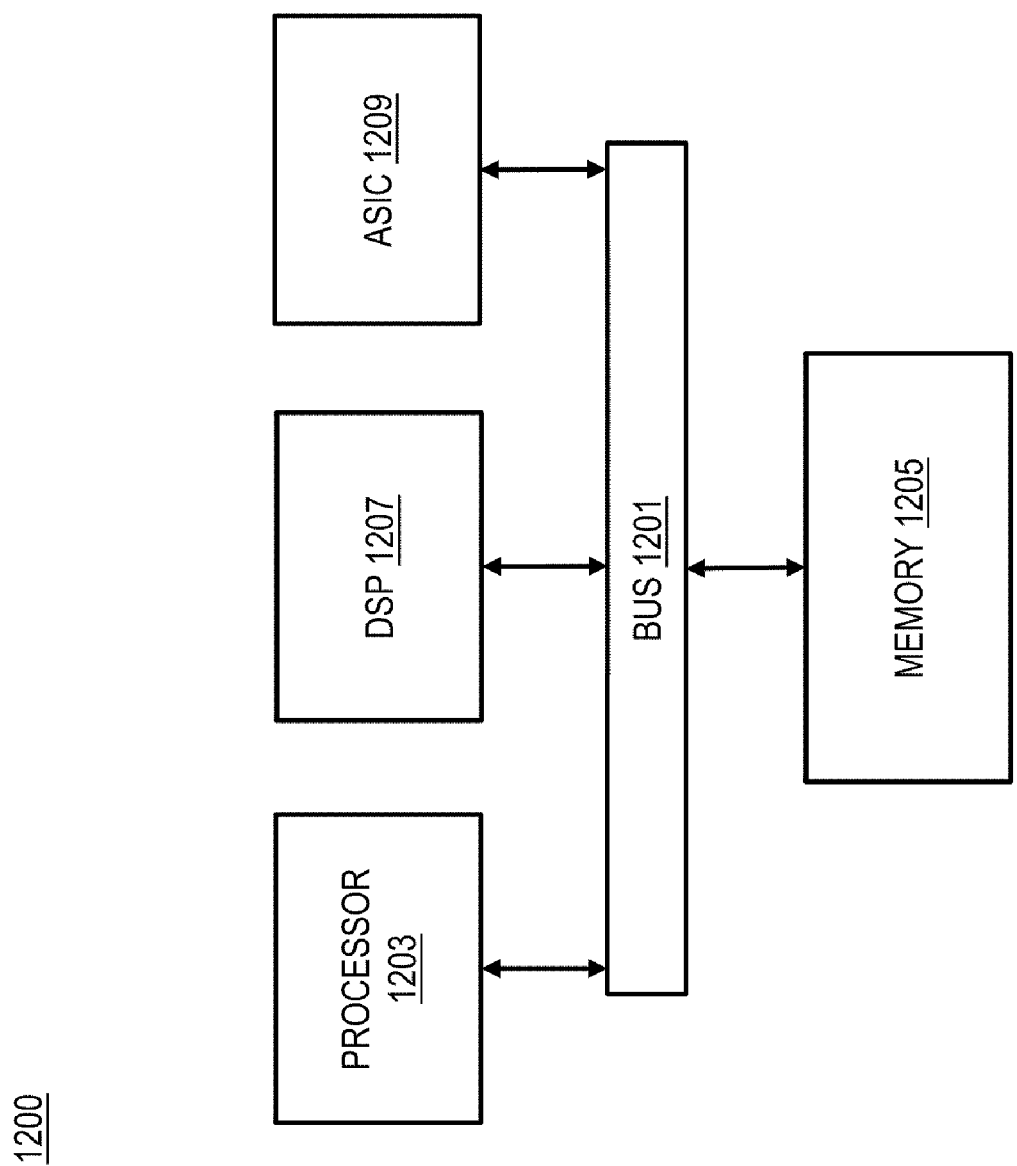
FIG. 12 is a diagram of a chip set that can be used to implement an embodiment of the invention.

FIG. 12 illustrates a chip set 1200 upon which an embodiment of the invention may be implemented. Chip set 1200 is programmed to determine the existence of an event based on information collected from UEs 101 as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of determining the existence of an event based on information collected from UEs 101.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to determine the existence of an event based on information collected from UEs 101. The memory 1205 also stores the data associated with or generated by the execution of the inventive steps.

Figure 13:
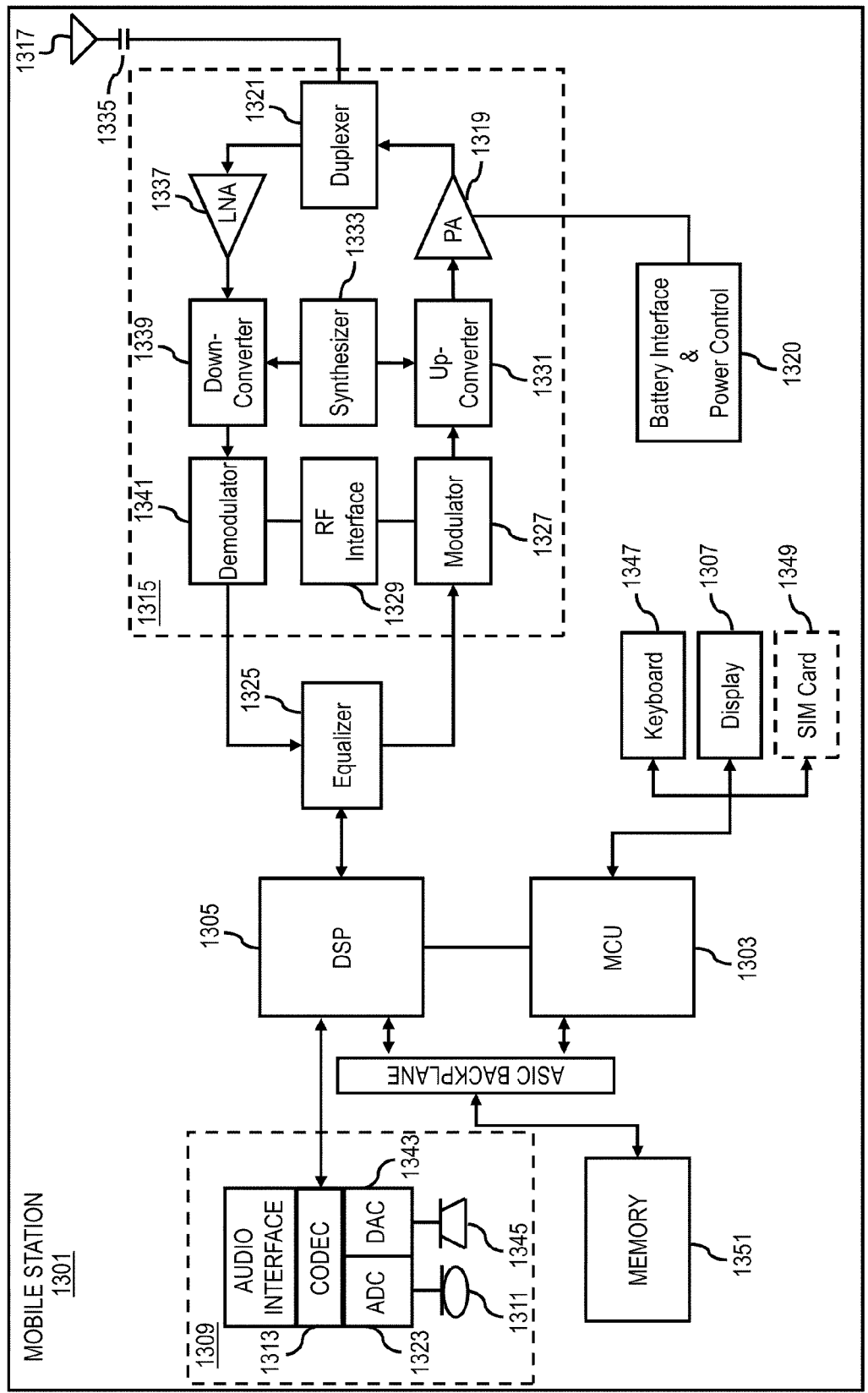
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1300, or a portion thereof, constitutes a means for performing one or more steps of collecting information to determine the existence of an event. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of collecting information to determine the existence of an event. The display 13 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to collect information to determine the existence of an event. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

receiving at a user device media from a plurality of mobile devices;

determining at the user device a plurality of event vectors for the respective mobile devices, wherein each of the event vectors includes geo-location information, altimeter data, and timing information of the corresponding mobile devices;

determining at the user device existence of an event based on the received media and the event vectors;

determining a focal point associated with the event based on the event vectors;

determining an area of extent associated with the event based on the focal point and the event vectors;

determining a type of the event based on the focal point and the event vectors;

determining an altitude of at least one of the mobile devices based on the event vectors;

determining a vantage point of the at least one mobile device as higher, same, or lower in relation to the focal point based upon the altitude; and causing, at least in part, representation of the focal point and the vantage point in a three-dimensional space.

2. A method of claim 1, further comprising:

determining a region associated with the event; and causing, at least in part, retrieval of historical event data associated with the region, wherein the determination of the existence of the event is further based on the historical event data.

3. A method of claim 2, the method further comprising:

determining a historical event determination threshold associated with the historical event data;

determining a current event score based on the received media and the event vectors; and comparing the current event score with the historical event determination threshold, wherein the determination of the existence of the event is further based on the comparison.

4. A method of claim 3, further comprising:

determining a current weighted event score by associating a base score with at least one of the mobile devices and weighting the base score based on a user profile associated with the at least one of the mobile devices;

comparing the current weighted event score with the historical event determination threshold; and determining existence of the event further based, at least in part, on the comparison.

5. A method of claim 3, wherein a plurality of historical event determination thresholds are defined differently based on a plurality of types of real property.

6. A method of claim 5, wherein a historical event determination threshold of a residential area is set higher than a historical event determination threshold of a commercial area.

7. A method of claim 6, wherein a historical event determination threshold of an urban area is set higher than a historical event determination threshold of a rural area.

8. A method of claim 1, wherein the event vectors further include orientation data including, at least in part, accelerometer data, magnetometer data, the altimeter data, or a combination thereof.

9. A method of claim 1, wherein the event vectors further include data from sensors including, at least in part, air pressure sensor, thermometer, or a combination thereof, and the method further comprising:

determining a type of the event based on the event vectors.

10. A method of claim 1, the method further comprising:

receiving a request for event data from another mobile device specifying a location of the other mobile device;

selecting the event for presentation to be based on the location;

categorizing the received media into one or more views; and selecting one of the views of the event for presentation.

11. A method of claim 1, wherein the user device is a mobile device, and the media received from one of the mobile devices includes event vectors from another one or more of the mobile devices.

12. A method of claim 1, wherein the media, the event vectors, or a combination thereof are received from a master mobile device among the mobile devices that collect the media, the event vectors, or a combination thereof from other ones of the mobile devices.

13. A method of claim 1, wherein the event vectors are received from the mobile devices separately from the media.

14. An apparatus comprising:
at least one processor; and
at least one memory including computer program code,
the at least one memory and the computer program code configured to, with the at least one processor, cause the apparatus to perform at least the following,
receive media from a plurality of mobile devices;
determine a plurality of event vectors for the respective mobile devices, wherein each of the event vectors includes geo-location information, altimeter data, and timing information of the corresponding mobile device;
determine existence of an event based on the received media and the event vectors;
determine a focal point associated with the event based on the event vectors;
determine an area of extent associated with the event based on the focal point and the event vectors;
determine a type of the event based on the focal point and the event vectors;
determine an altitude of at least one of the mobile devices based on the event vectors;
determine a vantage point of the at least one mobile device as higher, same, or lower in relation to the focal point based upon the altitude; and
cause, at least in part, representation of the focal point and the vantage point in a three-dimensional space,
wherein the apparatus is embedded in a user device.

15. An apparatus of claim 14, wherein the apparatus is further caused, at least in part, to:
determine a region associated with the event; and
cause, at least in part, retrieval of historical event data associated with the region, wherein the determination of the existence of the event is further based on the historical event data.

16. An apparatus of claim 15, wherein the apparatus is further caused, at least in part, to:
determine a historical event determination threshold associated with the historical event data;
determine a current event score based on the received media and the event vectors; and
compare the current event score with the historical event determination threshold, wherein the determination of the existence of the event is further based on the comparison.

17. A non-transitory computer-readable storage medium carrying one or more sequences of one or more instructions which, when executed by one or more processors, cause an apparatus to at least perform the following steps:
receiving media from a plurality of mobile devices;
determining a plurality of event vectors for the respective mobile devices, wherein each of the event vectors includes geo-location information, altimeter data, and timing information of the corresponding mobile device;
determining existence of an event based on the received media and the event vectors;
determining a focal point associated with the event based on the event vectors;
determining an area of extent associated with the event based on the focal point and the event vectors;
determining a type of the event based on the focal point and the event vectors;
determining an altitude of at least one of the mobile devices based on the event vectors;
determining a vantage point of the at least one mobile device as higher, same, or lower in relation to the focal point based upon the altitude; and
causing, at least in part, representation of the focal point and the vantage point in a three-dimensional space,
wherein the apparatus is embedded in a user device.

18. A non-transitory computer-readable storage medium of claim 17, further comprising:
determining a region associated with the event; and
causing, at least in part, retrieval of historical event data associated with the region, wherein the determination of the existence of the event is further based on the historical event data.

19. A non-transitory computer-readable storage medium of claim 18, wherein the apparatus is caused, at least in part, to further perform:
determining a historical event determination threshold associated with the historical event data;
determining a current event score based on the received media and the event vectors; and
comparing the current event score with the historical event determination threshold, wherein the determination of the existence of the event is further based on the comparison.

* * * * *